Sept. 12, 1967 H. L. DOBRIKIN ET AL 3,341,258
RELAY-MODULATION VALVE
Filed June 15, 1964

INVENTORS.
HAROLD L. DOBRIKIN
CHARLES HOROWITZ
BY
Parker & Carter
ATTORNEYS.

United States Patent Office  
3,341,258  
Patented Sept. 12, 1967

3,341,258  
RELAY-MODULATION VALVE  
Harold L. Dobrikin, Highland Park, and Charles Horowitz, Skokie, Ill., assignors, by mesne assignments, to Berg Mfg. & Sales Co., Des Plaines, Ill., a corporation of Illinois  
Filed June 15, 1964, Ser. No. 375,042  
2 Claims. (Cl. 303—54)

This invention relates to vehicle brake pressure systems and has particular relation to valve mechanisms for relaying and controlling the application of fluid pressure to vehicle brakes.

One purpose of the invention is to provide a valve mechanism effective to vary the pressure applied to vehicle brakes in relation to the load carried by said vehicle.

Another purpose is to provide variable-ratio valve elements effective to vary the pressure applied to vehicle brakes in response to vehicle loads.

Another purpose is to provide a valve structure having a fulcrum element movable at minimum resistance.

Another purpose is to provide a valve mechanism effective to vary the fluid pressure applied to vehicle brakes in response to variances in the load carried by the vehicle and free from variances produced by occasional relatively minute shocks, vibrations and the like.

Another purpose is to provide a load-modulation valve of maximum compactness and economy of manufacture.

Another purpose is to provide a combined relay and load-modulation valve.

Another purpose is to provide a load-modulation valve capable of minute adjustment.

Another purpose is to provide a valve structure effective to perform both the relay and load-modulation functions.

Another purpose is to provide a valve mechanism effective to modulate the pressures transmitted thereby in response to the load of a vehicle with which the valve mechanism is associated.

Other purposes will appear from time to time during the course of the specification and claims.

Figure 1:
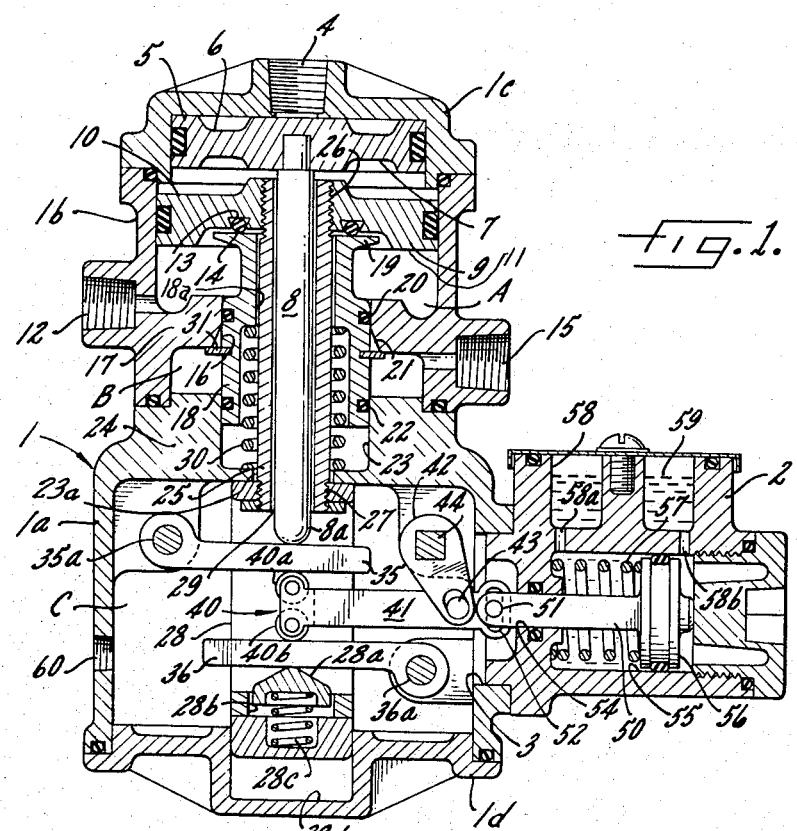
Figure 2:
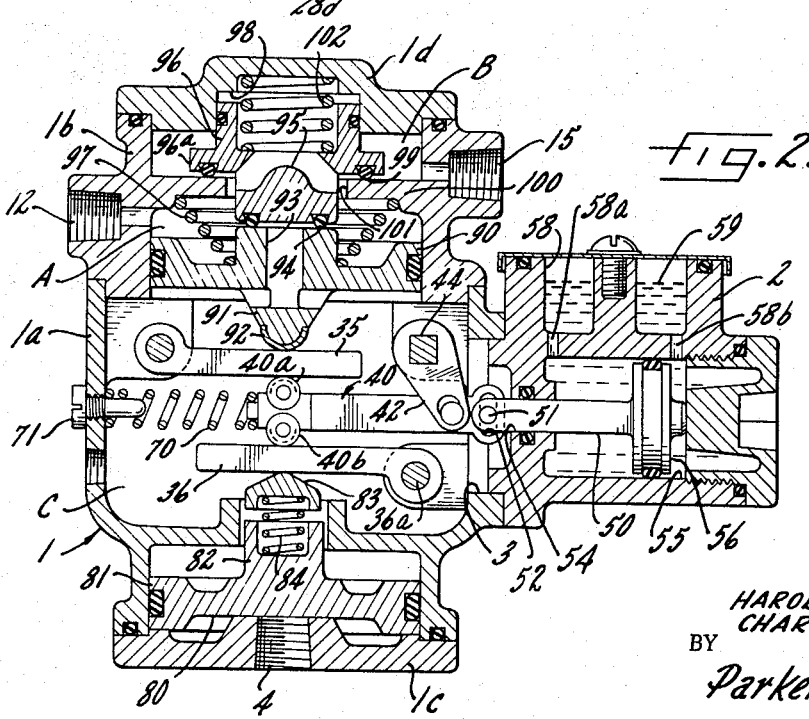

The invention is illustrated more or less diagrammatically in the accompanying drawings, wherein:

FIGURE 1 is a side elevation in partial cross section illustrating one form of the invention; and FIGURE 2 is a side elevation in partial cross section illustrating another form of the invention.

Like parts are indicated by like numerals throughout the specification and drawings.

Referring now to the drawings, and particularly to FIGURE 1, the numeral 1 generally designates a valve housing. The housing 1 may be formed of separable segments 1a, 1b and end closure caps 1c, 1d. A subhousing 2 is secured to housing 1 in alignment with an opening 3 in a side wall thereof.

Housing 1 has a service pressure inlet 4 formed in the cap 1c. A service piston 5 is slidable in one end portion of housing 1 and presents a surface 6 to the inlet 4. The opposite surface 7 of piston 5 engages a rod 8. A piston 9 surrounds a portion of rod 8 adjacent to and opposed to piston 5. The piston 9 has one anular surface 10 opposed to surface 7 of piston 5 and an opposite anular surface 11 exposed to a chamber A in housing 1. A brake pressure outlet 12 communicates with chamber A. The surface 11 of piston 9 is grooved as at 13 for reception of a valve seat or seal ring 14.

The housing 1 has a tank pressure inlet 15 communicating with a chamber B within housing 1. A valve passage 16 extends through a web 17 between chambers B and A in housing 1 and a brake valve or cartridge 18 is slidable in passage 16 to control communication between chambers B and A through passage 16. The cartridge 18 has an annular valve portion 19 at one end thereof for engagement with seat 14. Intermediate its ends the valve element 18 carries a seal 20 for sealing engagement with the inner surface of valve passage 16. The mouth of valve passage 16 which communicates with chamber B has a plurality of inclined slots 21 circumferentially spaced therein and communicating with chamber B. Valve element 18 carries, adjacent its end opposite that carrying valve portion 19, a seal 22 for engagement with the inner surface of a well 23 formed in a second web 24 extending across housing 1 and dividing chamber B from a third chamber C.

A hollow shaft 25 surrounds rod 8 and has one of its ends threadably secured, as at 26, to piston 9. The opposite end of shaft 25 is threadably secured, as at 27, to a yoke member 28. It will be observed that the outer diameter of rod 8 is slightly less than the inner diameter of shaft 25 and that an axis-paralleling passage 29 is thereby created and extends from the area between pistons 5 and 9 to the area within chamber C. A spring 30 surrounds shaft 25 within well 23 and engages valve element 18 to urge the same toward piston 9. An annulus element 31 is carried by member 18 for engagement with web 24 to limit the movement of seal 20 within passage 16 and to insure its retention by member 18 within the passage 16 when the seal 20 is in alignment with slots 21.

A pair of rock arms or levers 35, 36 are spacedly mounted for pivotal movement within chamber C, the respective pivots 35a, 36a being positioned on opposite sides of yoke 28 and the elongated portion of arms 35, 36 extending, in overlapping relationship, into the through yoke 28. The rod 8 has its distal rounded end 8a in engagement with an upper surface, as the parts are shown in the drawings, of rod 35 and yoke 28 has a yieldingly supported rounded member 28a engaging a lower surface, as the parts are shown in the drawings, of arm 36. The member 28a is slidable in a well 28b and urged against arm 36 by spring 28c. The lower end of yoke 28 is reciprocally received in a housing well 28d.

A movable fulcrum 40 comprises an upper roller 40a in engagement with the opposite surface of arm 35 from that engaged by rod surface 8a and a second roller 40b in engagement with the opposite surface of arm 36 from that engaged by member 28a. The rollers 40a, 40b are rotatably carried at one end of a fulcrum arm 41. The fulcrum arm 41 is pivotally connected, adjacent its opposite end, to one end of a drive link 42, as indicated at 43. The drive link 42 has its opposite end connected to a drive shaft 44 which extends outwardly from housing 1 for engagement with a suitable actuating member (not shown). The fulcrum arm 41 also engages, adjacent the end thereof opposite that carrying rollers 40a, 40b, a piston rod 50. The rod 50 carries a pin 51 movable in a lateral slot 52 formed in arm 41. The rod 50 extends through a sealed passage 54 toward subhousing 2, the juncture of members 41, 50 being reciprocal through opening 3 in housing 1. Subhousing 2 contains a cylindrical chamber 55 in which a piston 56 is slidably mounted, the piston rod 50 being carried by piston 56. A yielding means 57 is positioned in chamber 55 to urge piston 56 in one direction, as the parts are shown in the drawings. A reservoir chamber 58 is formed in housing 2 and spaced restricted orifices or passages 58a, 58b communicate the reservoir chamber 58 with opposite ends of the piston chamber 55 in housing 2. Indicated at 59 is a supply of dampener fluid. Indicated at 60 is an exhaust outlet formed in housing 1 and communicating with chamber C.

Referring now particularly to that form of the invention illustrated in FIGURE 2, it will be observed that parts illustrated therein and corresponding substantially to those illustrated and described above with respect to the form of the invention illustrated in FIGURE 1 have, for convenience and clarity, been designated by the same numerals. Thus the structure of FIGURE 2 includes a housing 1 with housing segments 1a, 1b and end caps 1c, 1d. The housing has a subhousing 2 attached to housing 1 for communication with an opening 3 formed in the wall of housing 1. A service pressure inlet 4 is formed in cap 1c. A brake pressure outlet 12 communicates with a chamber A and a tank pressure inlet 15 communicates with a chamber B. Within a chamber C rock arms 35, 36 extend in opposite directions toward each other and on opposite sides of a fulcrum member 40 having rollers 40a, 40b, drive link 42 and piston rod 50 connected thereto in the manner described above with relation to the structure shown in FIGURE 1. The structure of the elements in subhousing 2 corresponds substantially to that described with respect to the same elements illustrated in FIGURE 1 and will not, therefore, be further described herein. In the structure of FIGURE 2, however, a spring 70 is positioned by bolt 71 and engages the end of fulcrum arm 40 adjacent the rollers 40a, 40b to urge fulcrum arm 40 toward subhousing 2, or to the right as the parts are shown in the drawings.

In the structure of FIGURE 2 pressure delivered through inlet 4 is effective upon the surface 80 of a service piston 81 reciprocal in housing 1. The opposite surface of piston 81 carries an extension 82 which in turn has an outer rounded end surface 83 for engagement with a surface of arm 36 opposite that engaged by roller 40b. The end surface 83 of extension 82 is yieldingly urged against arm 36 by a spring 84 carried by extension 82.

Reciprocal in chamber A is a piston or exhaust valve 90. The one surface of piston 90, which is exposed to chamber C, carries an extension 91 having a hardened material at its end surface, as indicated at 92, for engagement with the opposite surface of arm 35 from that engaged by roller 40a. A passage 93 extends through piston 90 for communication with chamber A on the opposite side of piston 90 from chamber C.

A valve seal or seat 94 is carried by an extension 95 on a third piston or brake valve 96, the seal or seat 94 engaging piston 90 about passage 93 to seal chamber A from chamber C. A yielding means 97 is positioned in chamber A to urge piston 90 and extension 91 toward chamber C to engage surface 92 with arm 35. Piston 96 is reciprocally mounted in a well 98 formed in cap 1d. An annular flange 96a is reciprocal in chamber B and carries a valve seat or seal 99 for engagement with an annulus 100 extending between chambers B and A to seal a passage 101 positioned to communicate chamber B with chamber A about the extension 95 which extends through passage 101 for sealing passage 93 by seal 94, the piston 96 being urged toward chamber A by yielding means 102 positioned in well 98.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

It will be understood that the actuating element (not shown) which engages shaft 44 outwardly of the housing of the invention is moved in response to variances in load placed upon the vehicle with which the relay load-modulation valve of the invention is employed. Such actuating element may, for example, be moved by variances in the distance between the vehicle body and the axle thereof as the load carried by the vehicle is increased or decreased. Similarly, such actuating element may be appropriately moved by pressure changes when the valve of the invention is employed with air-supported vehicles. In either case movement of such actuating element produces a corresponding movement of shaft 44 and a consequent movement of actuating link 42 to position the fulcrum formed by rollers 40a, 40b at the appropriate position between arms 35, 36.

Referring, for example, to the structure of FIGURE 1 and to the position of the parts therein, it will be observed that fulcrum 40a, 40b is in direct alignment with yoke portion 28a and rod surface 8a. Upon application by the vehicle operator of service pressure to apply the brakes, fluid pressure entering inlet 4 moves piston 5 away from inlet 4, or downwardly as the parts are shown in the drawings. Said movement of piston 5 is effective to rotate arms 35, 36 through the medium of rod 8 and fulcrum 40a, 40b. With the fulcrum in the position shown, the ratio of the valve is one-to-one. Movement of rod 36, in counterclockwise direction as the parts are shown and in response to the described movement of piston 5, is effective, through engagement of element 28a, to move yoke 28 downwardly into well 28d and to draw piston 9, through the medium of shaft 25, toward annulus 17, or downwardly as the parts are shown in the drawings. Piston 9 carries with it the valve plug 18 to move seal 20 into alignment with slots 21, and thus to provide communication between chamber B and chamber A and to provide for passage of fluid pressure from inlet 15 through chamber B, slots 21, passage 16 and chamber A to brake outlet 12, the amount of movement of valve element 18 controlling the amount of pressure delivered to outlet 12.

Upon release of vehicle operator foot pressure, pressure trapped in the lines attached to outlet 12 and in chamber A is exhausted through seat 14 when piston 9 is moved away from valve plug 18 by pressure in chamber A and through exhaust passage 18a extending through valve member 18 about shaft 25, the passage 18a communicating with chamber C and exhaust outlet 60 through an opening 23a in the bottom of well 23. Spring 30 is effective to return valve plug 18 to the position shown in the drawings and to reseal the described exhaust passage by engagement of valve portion 19 with valve seat 14.

Upon a variance in the load carried by the vehicle, the described actuating arm and shaft 44 will be moved a proportionate amount and fulcrum 40a, 40b will be moved between arms 35, 36 from the position shown in the drawings. With the fulcrum moved, for example, to the right as the parts are shown in the drawings, the ratio between movement of piston 5 and yoke 28 is changed, i.e. the same amount of movement of piston 5, described above, will produce a correspondingly greater movement of yoke 28 and hence, through elongation, in effect, of arm 36, greater movement of piston 9 and valve seal 20 along slots 21 to provide a greater amount of fluid pressure to outlet 12, the annulus 31 serving as a stop means for maximum movement of valve element 18 when element 31 engages the annulus 24.

Referring now to the form of the invention illustrated in FIGURE 2, it will be observed that actuation of the brake pedal of a vehicle to deliver fluid pressure to service inlet 4 produces a corresponding movement of piston 81, and, through the mediary of arm 36, fulcrum 40a, 40b and extension 91, a corresponding movement of piston 90. Since the fulcrum 40a, 40b is shown in FIGURE 2 as being in direct alignment with the point of engagement of extension surface 83 of piston 81 and surface 92 of piston 90, the ratio is one-to-one and the pistons 81 and 90 will be moved identical distances. Movement of piston 90 is effective to unseat valve seal 99 from annulus 100 and to communicate inlet 15 through chamber B, passage 101 and chamber A with outlet 12 to deliver a predetermined amount of fluid pressure from pressure inlet 15 to brake pressure outlet 12.

Upon cessation of fluid pressure at inlet 4, spring 97 is effective to return piston 90 and arms 35, 36 and piston 81 to the position shown. Separation of piston 90 from extension 95 of piston 96 communicates outlet passage 93 with chamber A and fluid pressure in elements attached to outlet 12, as well as that in chamber A, is exhausted through passage 93, chamber C and exhaust outlet 60. Spring 102 is effective to return piston 96 to the position shown and to seal off passages 101 and 93. As above described, with respect to the structure of FIGURE 1, movement or re-positioning of fulcrum 40a, 40b by actuating link 92 in response to the movement of an actuating arm (not shown) as a result to variances in the load of the vehicle will vary the ratio of movement imparted to piston 90 by a given movement of piston 81 to vary the amount of pressure delivered from inlet 15 to outlet 12.

In the structure illustrated in both FIGURES 1 and 2 subhousing 2 provides a dampener means for movement of fulcrum arm 40. As piston 56 moves in either direction within chamber 55, fluid is caused to flow through orifices 58a, 58b between reservoir 58 and chamber 55. The restricted orifices 58a, 58b thus resist the movement of piston 56 and of arm 40.

The dual rollers 40a, 40b provide a fulcrum movable to desired position at minimum resistance, since the frictional engagements between the rollers and arms 35, 36 are separated and independent.

Thus the valve of the invention, in both forms shown as embodiments, is effective simultaneously to relay a portion of the inlet pressure delivered at a fixed, uniform amount thereto from a reservoir or tank (not shown) and to vary said amount in response to variance in the load carried by the vehicle. The need for separate housings, conduits, mounting brackets and the like, as required by separate relay and modulation valves is avoided. The action of the valve is positive and reliable. Intermittent vibrations, road shocks and the like which may be transmitted to shaft 44 are absorbed by the dampener structure provided. The valve provides a saving of useful space. Springs 28c, 30, 84, 97 and 102 resist minute movements of arms 35, 36 and insure the opening of exhaust channels upon release of service inlet pressure with pressure remaining in chamber A. The pivotal-slidable engagement of arm 50 and link 42 with arm 41 permits rotation of arm 41 about rollers 40a, 40b as the fulcrum formed thereby is moved.

There is claimed:

1. A combined relay and load responsive valve for vehicles including a housing, a moveable wall in said housing, a service inlet positioned in said housing for delivery of fluid pressure to one side of said wall to move the same in one direction, a fluid pressure inlet and a fluid pressure outlet in said housing, valve elements positioned in said housing to be opened in response to movement of said wall in said direction and to communicate said inlet with said outlet upon opening, a variable-ratio engagement structure between and engaging said wall and valve elements whereby a predetermined movement of said wall in said direction produces a selectively predetermined amount of opening of communication between said inlet and said outlet, wherein said valve elements are axially aligned with said wall and said variable-ratio engagement structure includes a pair of levers pivoted in said housing and extending in parallel, spaced relationship perpendicularly across the axis of said wall and valve elements, a fulcrum between and engaging said levers and moveable therebetween in a path perpendicularly across said axis, and said wall and valve elements are located on one side of said levers, a yoke engages said valve elements and one of said levers and a rod engages said moveable wall and the other of said levers.

2. The structure of claim 1 further characterized in that said yoke extends about said levers and said rod extends through said valve elements.

References Cited

UNITED STATES PATENTS

| | | | |
|---|---|---|---|
| 1,842,497 | 1/1932 | Whitaker | 303—3 |
| 2,334,834 | 11/1943 | Newell | 303—54 |
| 2,396,432 | 3/1946 | McClure | 303—54 |
| 2,940,796 | 6/1960 | Orthmann et al. | |
| 3,155,435 | 11/1964 | Nicolay et al. | 303—22 |

BENJAMIN HERSH, *Primary Examiner.*

EUGENE G. BOTZ, *Examiner.*

M. S. SALES, K. H. BETTS, J. A. PEKAR,
*Assistant Examiners.*